(12) United States Patent
Lefebvre et al.

(10) Patent No.: US 10,443,449 B2
(45) Date of Patent: Oct. 15, 2019

(54) SPOKE MOUNTING ARRANGEMENT

(71) Applicant: Pratt & Whitney Canada Corp., Longueuil (CA)

(72) Inventors: Guy Lefebvre, St-Bruno-de-Montarville (CA); Remy Synnott, St-Jean-sur-Richelieu (CA); John Pietrobon, Outremont (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 502 days.

(21) Appl. No.: 15/206,579

(22) Filed: Jul. 11, 2016

(65) Prior Publication Data

US 2017/0107856 A1    Apr. 20, 2017

Related U.S. Application Data

(60) Provisional application No. 62/196,360, filed on Jul. 24, 2015, provisional application No. 62/196,330, filed on Jul. 24, 2015.

(51) Int. Cl.
 *F01D 25/24* (2006.01)
 *F01D 25/16* (2006.01)

(52) U.S. Cl.
 CPC ......... *F01D 25/246* (2013.01); *F01D 25/162* (2013.01); *F05D 2230/60* (2013.01); *F05D 2260/30* (2013.01); *F05D 2260/31* (2013.01)

(58) Field of Classification Search
 CPC .............................. F01D 25/162; F01D 25/246
 See application file for complete search history.

(56) References Cited

U.S. PATENT DOCUMENTS

| | | | |
|---|---|---|---|
| 3,261,587 | A | 7/1966 | Rowley |
| 3,403,889 | A | 10/1968 | Ciokajlo |
| 3,451,456 | A | 6/1969 | Dey |
| 3,543,588 | A | 12/1970 | Richardson |
| 4,050,494 | A | 9/1977 | de Claire |
| 4,183,207 | A | 1/1980 | Libertini |
| 4,214,851 | A | 7/1980 | Tuley et al. |
| 4,321,007 | A | 3/1982 | Dennison et al. |
| 4,369,016 | A | 1/1983 | Dennison |

(Continued)

FOREIGN PATENT DOCUMENTS

| | | |
|---|---|---|
| CN | 101743391 | 6/2010 |
| CN | 102678334 | 9/2012 |

(Continued)

OTHER PUBLICATIONS

International Search Report for PCT application No. PCT/CA2016/050817 dated Sep. 12, 2016.

(Continued)

*Primary Examiner* — Woody A Lee, Jr.
(74) *Attorney, Agent, or Firm* — Norton Rose Fulbright Canada L.L.P.

(57) ABSTRACT

A mid-turbine frame of a gas turbine engine has a structural ring assembly comprising an outer ring, an inner ring having a plurality of threaded bosses extending from a radially outer surface thereof, and a corresponding number of structural spokes interconnecting the inner ring to the outer ring. Each spoke has a radially inner threaded end threadably engaged in an associated one of the threaded bosses on the inner ring.

19 Claims, 4 Drawing Sheets

(56) References Cited

U.S. PATENT DOCUMENTS

| | | |
|---|---|---|
| 4,571,936 A | 2/1986 | Nash et al. |
| 4,735,536 A | 4/1988 | Duran |
| 4,747,738 A | 5/1988 | Duran |
| 4,793,770 A | 12/1988 | Schonewald et al. |
| 4,815,908 A | 3/1989 | Duran et al. |
| 4,820,117 A | 4/1989 | Larrabee et al. |
| 4,836,708 A | 6/1989 | Chambers et al. |
| 4,943,013 A | 7/1990 | Kapala et al. |
| 4,948,316 A | 8/1990 | Duran et al. |
| 4,979,872 A | 12/1990 | Myers et al. |
| 4,987,736 A | 1/1991 | Ciokajlo et al. |
| 5,076,049 A | 12/1991 | Von Benken et al. |
| 5,080,555 A * | 1/1992 | Kempinger ............ F01D 9/065 415/108 |
| 5,160,251 A | 11/1992 | Ciokajlo |
| 5,180,282 A | 1/1993 | Lenhart et al. |
| 5,236,303 A | 8/1993 | Fowler et al. |
| 5,272,869 A | 12/1993 | Dawson et al. |
| 5,292,227 A | 3/1994 | Czachor et al. |
| 5,357,744 A * | 10/1994 | Czachor ................ F01D 9/065 415/134 |
| 5,438,756 A | 8/1995 | Halchak et al. |
| 5,456,719 A | 10/1995 | Keller |
| 5,517,817 A | 5/1996 | Hines |
| 5,634,767 A | 6/1997 | Dawson |
| 5,746,574 A | 5/1998 | Czachor et al. |
| 5,941,683 A | 8/1999 | Ridyard et al. |
| 6,250,840 B1 | 6/2001 | Urbach et al. |
| 6,290,442 B1 | 9/2001 | Peterkort |
| 6,358,001 B1 | 3/2002 | Bosel et al. |
| 6,439,616 B1 | 8/2002 | Karafillis et al. |
| 6,439,841 B1 | 8/2002 | Bosel |
| 6,547,518 B1 | 4/2003 | Czachor et al. |
| 6,619,030 B1 | 9/2003 | Seda et al. |
| 6,860,716 B2 | 3/2005 | Czachor et al. |
| 6,883,303 B1 | 4/2005 | Seda |
| 6,889,939 B2 | 5/2005 | Rouyre et al. |
| 7,055,305 B2 | 6/2006 | Baxter |
| 7,063,505 B2 | 6/2006 | Czachor |
| 7,195,447 B2 | 3/2007 | Moniz et al. |
| 7,220,119 B1 | 5/2007 | Kirchmer et al. |
| 7,273,345 B2 | 9/2007 | Birrell |
| 7,419,121 B2 | 9/2008 | Williams |
| 7,584,621 B2 | 9/2009 | Spitzer et al. |
| 7,594,404 B2 | 9/2009 | Somanath et al. |
| 7,597,537 B2 | 10/2009 | Bucaro et al. |
| 7,610,763 B2 | 11/2009 | Somanath et al. |
| 7,748,209 B1 | 7/2010 | Schopf et al. |
| 7,775,049 B2 | 8/2010 | Kumar et al. |
| 8,001,791 B2 | 8/2011 | Somanath et al. |
| 8,061,969 B2 | 11/2011 | Durocher et al. |
| 8,091,371 B2 | 1/2012 | Durocher et al. |
| 8,099,962 B2 | 1/2012 | Durocher et al. |
| 8,113,768 B2 | 2/2012 | Somanath et al. |
| 8,181,466 B2 | 5/2012 | Kumar et al. |
| 8,215,901 B2 | 7/2012 | Kapustka |
| 8,245,518 B2 | 8/2012 | Durocher et al. |
| 8,347,500 B2 | 1/2013 | Durocher et al. |
| 8,347,635 B2 | 1/2013 | Durocher et al. |
| 8,371,127 B2 | 2/2013 | Durocher et al. |
| 8,371,812 B2 | 2/2013 | Manteiga et al. |
| 8,388,306 B2 | 3/2013 | Somanath et al. |
| 8,500,392 B2 | 8/2013 | Durocher et al. |
| 8,550,773 B2 | 10/2013 | Almstedt et al. |
| 8,578,584 B2 | 11/2013 | Durocher et al. |
| 8,579,583 B2 | 11/2013 | Bock |
| 8,616,835 B2 | 12/2013 | Hashimoto |
| 8,740,550 B2 | 6/2014 | Tanioka |
| 8,827,255 B2 | 9/2014 | Woods |
| 8,863,531 B2 | 10/2014 | Scott |
| 8,876,463 B2 | 11/2014 | Durocher et al. |
| 8,882,384 B2 | 11/2014 | Bynum |
| 8,888,427 B2 | 11/2014 | Ruppert et al. |
| 8,920,109 B2 | 12/2014 | Tham et al. |
| 8,944,749 B2 | 2/2015 | Durocher et al. |
| 8,992,173 B2 | 3/2015 | Farah et al. |
| 9,011,060 B2 | 4/2015 | Hyatt |
| 9,091,171 B2 | 7/2015 | Rodriguez |
| 9,097,138 B2 | 8/2015 | Glahn et al. |
| 9,097,141 B2 | 8/2015 | Paradis |
| 9,140,137 B2 | 9/2015 | Mayer et al. |
| 9,145,908 B2 | 9/2015 | Gill et al. |
| 9,151,316 B2 | 10/2015 | Smith et al. |
| 9,157,325 B2 | 10/2015 | Suciu et al. |
| 9,194,252 B2 | 11/2015 | Farah et al. |
| 9,200,536 B2 | 12/2015 | McCaffrey |
| 9,217,371 B2 | 12/2015 | Farah et al. |
| 9,222,413 B2 | 12/2015 | Farah et al. |
| 9,279,341 B2 | 3/2016 | Durocher et al. |
| 9,303,528 B2 | 4/2016 | Sanchez et al. |
| 9,316,117 B2 | 4/2016 | Sanchez et al. |
| 9,316,153 B2 | 4/2016 | Patat et al. |
| 9,328,629 B2 | 5/2016 | Scott et al. |
| 9,347,374 B2 | 5/2016 | Suciu et al. |
| 9,382,844 B2 | 7/2016 | Muldoon et al. |
| 9,387,905 B2 | 7/2016 | Chonan |
| 9,399,520 B2 | 7/2016 | Cassagne et al. |
| 9,410,596 B2 | 8/2016 | Young et al. |
| 9,447,694 B2 | 9/2016 | Sanchez et al. |
| 9,458,721 B2 | 10/2016 | Palmer |
| 9,476,443 B2 | 10/2016 | Stoner |
| 9,482,115 B2 | 11/2016 | Harris et al. |
| 9,869,204 B2 | 1/2018 | Winn |
| 2007/0196196 A1 | 8/2007 | Schorling et al. |
| 2010/0132370 A1 * | 6/2010 | Durocher ............ F01D 25/162 60/796 |
| 2010/0132371 A1 | 6/2010 | Durocher et al. |
| 2010/0132372 A1 | 6/2010 | Durocher et al. |
| 2010/0132376 A1 * | 6/2010 | Durocher ............ F01D 9/065 60/797 |
| 2010/0275572 A1 | 11/2010 | Durocher |
| 2010/0303610 A1 | 12/2010 | Wang et al. |
| 2012/0227371 A1 | 9/2012 | Johnson |
| 2013/0052006 A1 | 2/2013 | Petty |
| 2013/0064647 A1 | 3/2013 | Hashimoto |
| 2013/0094951 A1 * | 4/2013 | McCaffrey ............ F01D 25/162 415/200 |
| 2013/0192238 A1 | 8/2013 | Munsell et al. |
| 2013/0192256 A1 | 8/2013 | Suciu et al. |
| 2013/0192267 A1 | 8/2013 | Sanchez et al. |
| 2013/0195624 A1 | 8/2013 | Schwarz et al. |
| 2014/0003920 A1 | 1/2014 | Scott |
| 2014/0007588 A1 | 1/2014 | Sanchez et al. |
| 2014/0013770 A1 * | 1/2014 | Farah ............ F01D 25/16 60/796 |
| 2014/0013771 A1 | 1/2014 | Farah et al. |
| 2014/0102110 A1 | 4/2014 | Farah et al. |
| 2014/0137534 A1 | 5/2014 | Sanchez et al. |
| 2014/0205447 A1 | 7/2014 | Patat |
| 2014/0227078 A1 | 8/2014 | Chokshi |
| 2014/0255174 A1 | 9/2014 | Duelm et al. |
| 2014/0271152 A1 | 9/2014 | Rodriguez |
| 2015/0044032 A1 | 2/2015 | Paradis et al. |
| 2015/0064000 A1 * | 3/2015 | Yagi ............ F01D 25/162 415/209.3 |
| 2015/0125291 A1 | 5/2015 | Chokshi |
| 2015/0192034 A1 | 7/2015 | Bedard et al. |
| 2015/0192165 A1 | 7/2015 | Bauer et al. |
| 2015/0192167 A1 | 7/2015 | Harris et al. |
| 2015/0233295 A1 | 8/2015 | Farah |
| 2015/0260057 A1 | 9/2015 | Farah et al. |
| 2015/0330250 A1 | 11/2015 | Scott |
| 2015/0337681 A1 | 11/2015 | Scott et al. |
| 2015/0338005 A1 | 11/2015 | Davis et al. |
| 2015/0345337 A1 | 12/2015 | Petty et al. |
| 2015/0345338 A1 | 12/2015 | Yeager et al. |
| 2015/0354411 A1 | 12/2015 | Scott |
| 2016/0017754 A1 | 1/2016 | Kumar |
| 2016/0017807 A1 * | 1/2016 | Chuong ............ F01D 25/30 415/213.1 |
| 2016/0024949 A1 | 1/2016 | Wilber |
| 2016/0032775 A1 | 2/2016 | Wang et al. |
| 2016/0107276 A1 | 4/2016 | Gekht et al. |
| 2016/0146101 A1 | 5/2016 | Lee |

(56) References Cited

U.S. PATENT DOCUMENTS

| | | | |
|---|---|---|---|
| 2016/0153315 A1 | 6/2016 | Kapustka et al. |
| 2016/0169050 A1 | 6/2016 | Scott et al. |
| 2016/0186614 A1 | 6/2016 | Paulino |
| 2016/0201512 A1 | 7/2016 | Bauer et al. |
| 2016/0201516 A1 | 7/2016 | Bauer et al. |
| 2016/0208644 A1 | 7/2016 | Burdick et al. |
| 2016/0208646 A1 | 7/2016 | Winn et al. |
| 2016/0208647 A1 | 7/2016 | Cherolis et al. |
| 2016/0208648 A1 | 7/2016 | Farah |
| 2016/0208655 A1 | 7/2016 | Farah et al. |
| 2016/0208699 A1 | 7/2016 | Cherolis et al. |
| 2016/0208701 A1 | 7/2016 | Cherolis et al. |
| 2016/0222827 A1 | 8/2016 | Winn et al. |
| 2016/0230598 A1 | 8/2016 | Cherolis et al. |
| 2016/0230602 A1 | 8/2016 | Broulidakis et al. |
| 2016/0230603 A1 | 8/2016 | Broulidakis et al. |
| 2016/0245105 A1 | 8/2016 | Farah et al. |
| 2016/0245114 A1 | 8/2016 | Wang |
| 2016/0265439 A1 | 9/2016 | Winn et al. |
| 2016/0273383 A1 | 9/2016 | Cherolis et al. |
| 2016/0273384 A1 | 9/2016 | Winn et al. |
| 2016/0290166 A1 | 10/2016 | Max et al. |
| 2016/0290167 A1 | 10/2016 | Porter et al. |
| 2016/0312659 A1 | 10/2016 | Lienau et al. |
| 2016/0326910 A1 | 11/2016 | Socha et al. |
| 2016/0333739 A1 | 11/2016 | Vo et al. |

FOREIGN PATENT DOCUMENTS

| | | | |
|---|---|---|---|
| CN | 102893162 | | 1/2013 |
| CN | 103306818 | | 9/2013 |
| CN | 10398246 | A | 8/2014 |
| CN | 203778897 | U | 8/2014 |
| CN | 104093553 | | 10/2014 |
| CN | 105805143 | A | 7/2016 |
| CN | 106958467 | | 7/2017 |
| DE | 3233976 | C1 | 8/1983 |
| EP | 1936210 | A1 | 6/2008 |
| EP | 2192271 | B1 | 9/2014 |
| EP | 2192273 | B1 | 9/2014 |
| FR | 2786230 | A1 | 5/2000 |
| GB | 898164 | A | 6/1962 |
| GB | 913407 | A | 12/1962 |
| GB | 1193056 | A | 5/1970 |
| GB | 1361994 | A | 7/1974 |
| GB | 1411299 | A | 10/1975 |
| GB | 2196083 | A | 4/1988 |
| KR | 1216286 | B1 | 12/2012 |
| KR | 1558493 | B1 | 10/2015 |
| WO | WO2011135199 | A1 | 11/2011 |
| WO | WO2014/105572 | | 7/2014 |
| WO | WO2014113034 | A1 | 7/2014 |
| WO | WO2014115187 | A1 | 7/2014 |
| WO | WO2014137574 | A1 | 9/2014 |
| WO | WO2015156882 | A2 | 10/2015 |
| WO | WO2015157751 | A1 | 10/2015 |

OTHER PUBLICATIONS

International Search Report for PCT application No. PCT/CA2016/050818 dated Aug. 25, 2016.
International Search Report for PCT application No. PCT/CA2016/050825 dated Sep. 19, 2016.
International Search Report for PCT application No. PCT/CA2016/050824 dated Sep. 28, 2016.

* cited by examiner

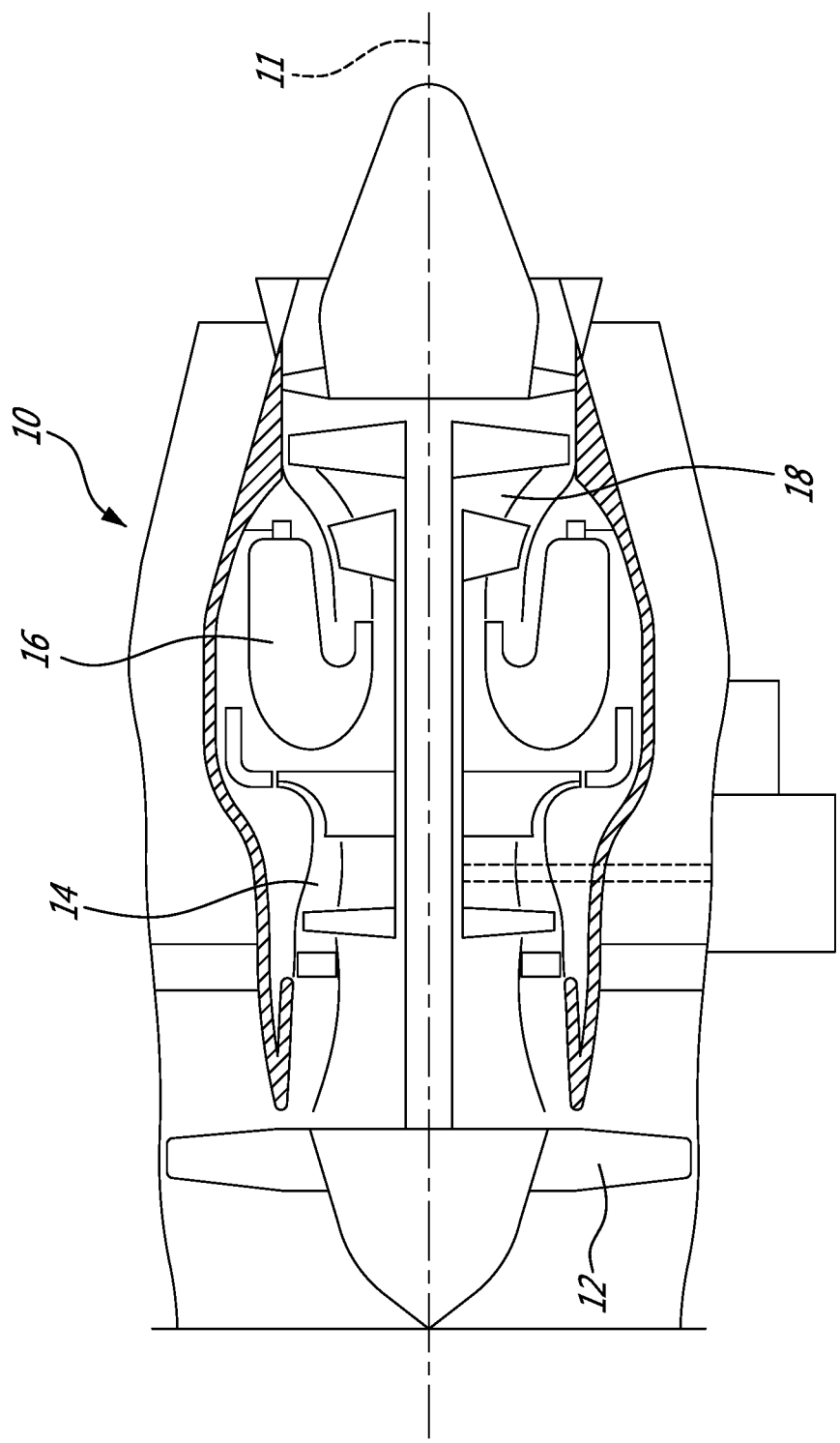

SPOKE MOUNTING ARRANGEMENT

RELATED PATENT APPLICATIONS

The present application claims priority on U.S. Patent Provisional Application Nos. 62/196,360 and 62/196,330 filed on Jul. 24, 2015, the entire contents of which are herein incorporated by reference.

TECHNICAL FIELD

The application relates generally to gas turbine engines and, more particularly, to a spoke mounting arrangement.

BACKGROUND OF THE ART

It is known to use structural spokes to transfer loads from a bearing casing to an outer structural ring of a gas turbine engine. For instance, such spokes may be found in mid-turbine frame modules. Each spoke typically extends radially from the outer ring through a strut in the gaspath to an inner ring supporting the bearing casing. Typically, mounting pads and multiple bolts with shim spacers are used to attach the inner end of each spoke to the inner ring and adjust the position of the inner ring relative to the outer ring. The use of machined pads/spacers adds to the final stack-up accumulation, increases the engine part count and adds complexity to the overall assembly.

SUMMARY

In one aspect, there is provided a simple way to attach an inner end of a spoke to an inner structural ring using a thread on the radially inner end of the spoke for threaded engagement with a corresponding threaded boss integrated to the inner structural ring.

According to another aspect, there is provided an inner structural ring adapted to receive and support a bearing casing, the inner structural ring having circumferentially spaced-apart threaded bosses on a radially outer surface thereof for threaded engagement with mating threads at the radially inner ends of respective spokes.

According to a further aspect, there is provided a structural ring assembly comprising an outer ring, an inner ring having a plurality of threaded bosses extending from a radially outer surface thereof, a corresponding number of structural spokes interconnecting the inner ring to the outer ring, each spoke having a radially inner threaded end threadably engaged in an associated one of the threaded bosses on the inner ring.

According to a further aspect, there is provided a mid-turbine frame of a gas turbine engine, comprising: an outer ring, an inner ring, and a plurality of circumferentially spaced-apart spokes structurally interconnecting the inner ring to the outer ring, the spokes having a radially inner threaded end threadably engaged to the inner ring and a radially outer end positioned to exert a force in a radially outward direction against a radially inner surface of the outer ring, the spokes being thereby held in compression between the inner and outer rings.

According to a further aspect, there is provided a gas turbine engine comprising a first turbine section, a second turbine section, a mid-turbine frame located axially between the first and second turbine sections, the mid-turbine frame comprising: an outer structural ring, an inner structural ring configured to support a bearing, a plurality of load carrying spokes structurally interconnecting the outer structural ring to the inner structural ring, each load carrying spoke having a radially inner threaded end threadably engaged with mating threads integrally formed in the inner structural ring and a radially outer end mounted in bearing contact against a radially inner surface of the outer structural ring, the load carrying spokes being thereby held in compression between the inner and outer structural rings.

According to a still further general aspect, there is provided a method of assembling a mid-turbine frame for use in a gas turbine engine axially between first and second turbine sections, the method comprising: threadably engaging respective radially inner threaded ends of individual spokes with corresponding threaded sites provided at circumferentially spaced-apart locations around a circumference of an inner structural ring, centralizing the inner structural ring relative to an outer structural ring, wherein centralizing comprises adjusting the length by which the spokes project radially outwardly from the inner structural ring by rotating the spoke about their respective longitudinal axes until respective radially outer ends of the spokes abut a radially inner surface of the outer structural ring and exert a radially outward force thereon, and then fastening the radially outer ends of the spokes to the outer structural ring to secure the spokes in compression between the inner and outer structural rings.

DESCRIPTION OF THE DRAWINGS

Reference is now made to the accompanying figures in which:

FIG. 1 is a schematic cross-section view of a gas turbine engine;

DETAILED DESCRIPTION

Figure 3:
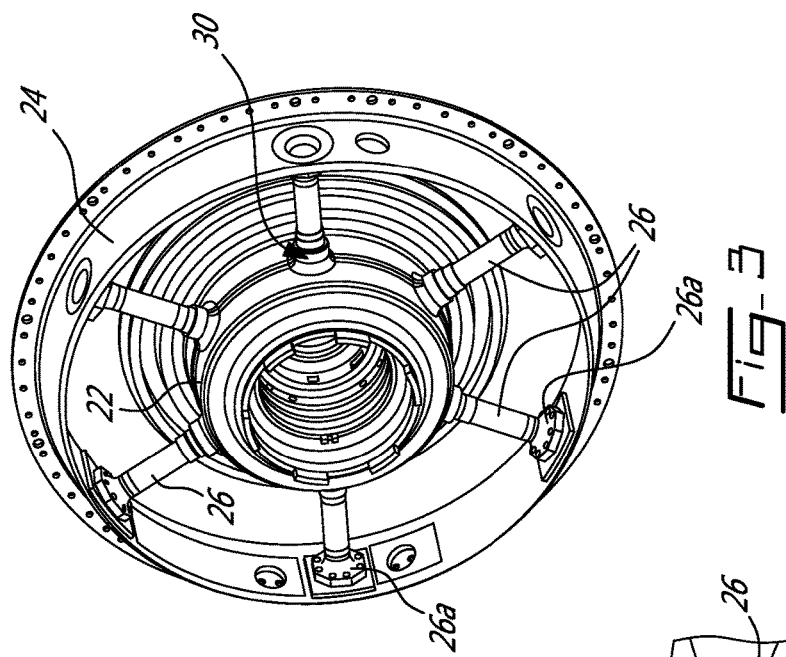
FIG. 3 is another isometric view of the mid-turbine frame module but with the integrated strut-vane casing omitted to better show the structural spokes extending between the inner and outer structural rings.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
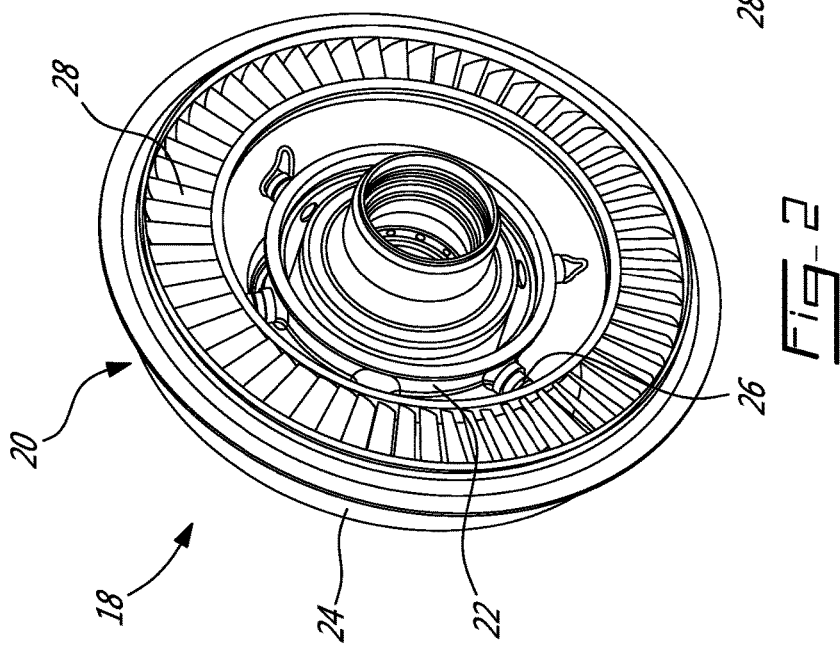
FIG. 2 is an isometric view of a mid-turbine frame module.
Figure 5:
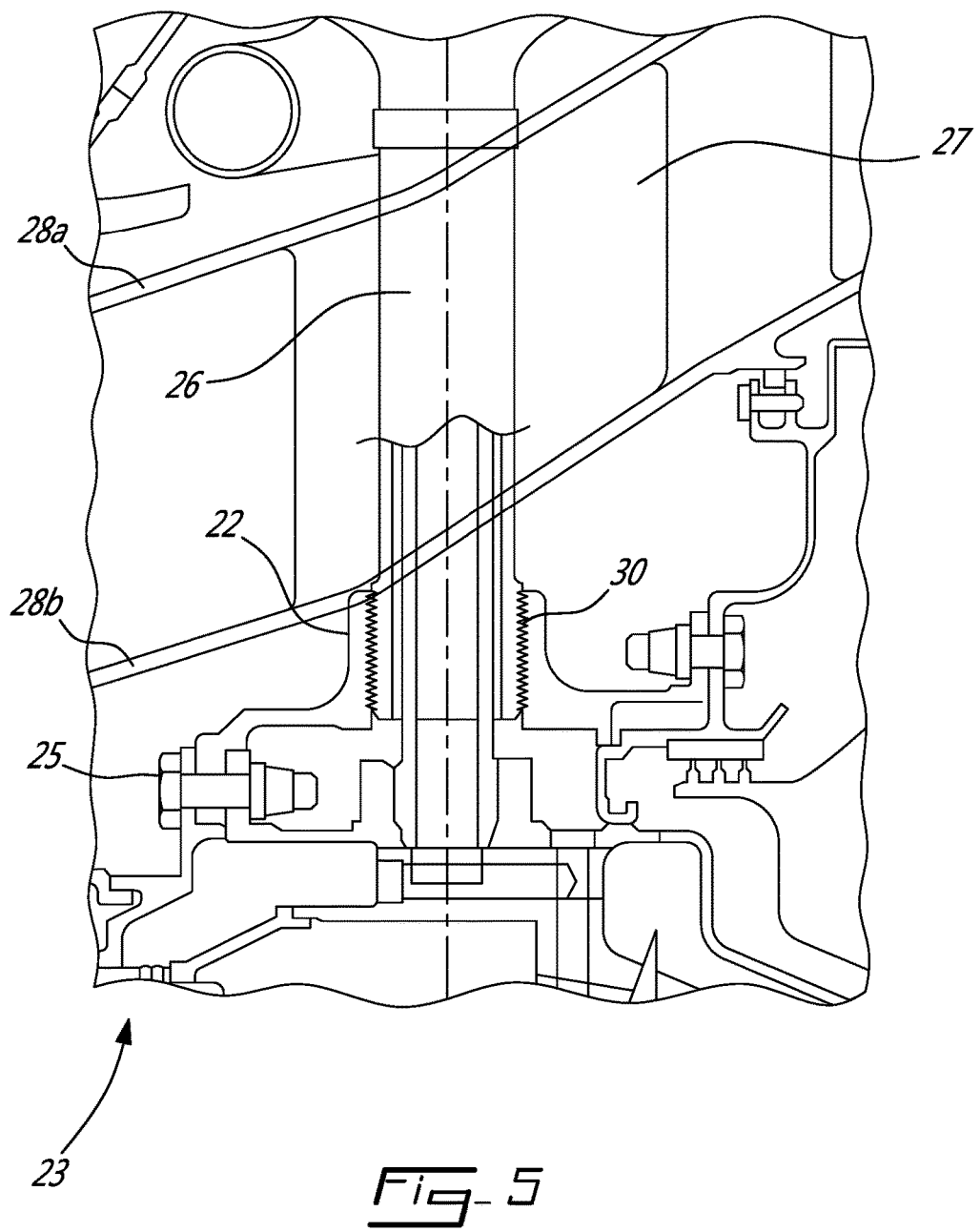
FIG. 5 is a cross-section view illustrating the radially inner end of the spoke threadably engaged in the threaded boss on the inner structural ring.

FIG. 2 shows a portion of the turbine section 18. More particularly, FIG. 2 illustrates a mid-turbine frame module 20 adapted to be axially mounted between first and second turbine sections. The mid-turbine frame module 20 comprises an inner structural ring 22 adapted to receive and support a bearing casing 23 (see FIG. 5) which is, in turn, adapted to support the main shafts of the engine 10. As shown in FIG. 5, the bearing casing 23 may be detachably mounted to the inner ring by means of bolts 25. Now referring concurrently to FIGS. 2 and 3, it can be seen that the inner structural ring 22 is structurally supported by an outer structural ring 24 by means of a plurality of circumferentially distributed spokes 26 (6 in the illustrated embodiment). In addition of transferring the loads from the inner ring 22 to the outer ring 24, the spokes 26 are used to centralize the inner ring 22 and, thus, the bearing casing 23 relative to the outer ring 24.

Each spoke 26 may extend radially through a hollow strut 27 (FIG. 5) of a non-structural integrated strut-vane casing 28 (FIG. 2) "floatingly" mounted between the inner and outer structural rings 22 and 24 for guiding the combustion gases between two axially adjacent turbine stages. The casing 28 has radially outer and radially inner gaspath walls 28a, 28b (FIG. 5) defining therebetween a portion of the gaspath of the turbine section 18. According to the illustrated embodiment, the casing 28 does not play a structural role. That is loads from the bearing casing 23 are not transmitted to the outer casing 24 via the integrated strut-vane casing 28. The loads are rather transmitted through the spokes 26, which are shielded from the hot combustion gases by the hollow struts 27 of the integrated strut-vane casing 28. In such an arrangement, the spokes can be referred to as cold spokes.

Figure 4:
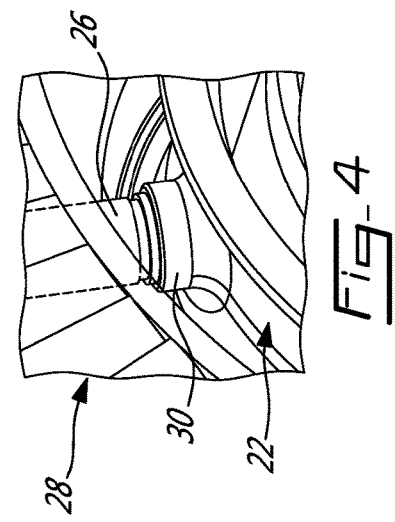
FIG. 4 is an enlarged isometric view illustrating the inner end of a spoke threadably engaged in a threaded boss extending from a radially outer surface of the inner structural ring.

As best shown in FIGS. 3 to 5, each spoke 26 is threadably engaged at its radially inner end with a threaded boss 30 integrally formed on the inner ring 22. According to the illustrated example, external threads at the radially inner end of the spokes are engaged with mating threads of an internally threaded boss 30 projecting radially outwardly from the radially outer surface of the inner ring 22. It is noted that the threaded bosses 30 could extend from the radially inner circumferential surface of the inner ring 22 and are, thus, not limited to be provided on the radially outer surface of the inner ring. The bosses could be provided at various radial/circumferential locations on the inner ring. Also, it is understood that the internal threads could be provided on the spokes and the external threads on the bosses. Also each threaded site on the inner ring 22 could adopt various suitable configurations to provide the required length of threads.

The threads on the spoke 26 may be machined concurrently with a turning operation of the spoke. The inner ring 22 may be casted, machined or otherwise suitably produced in the form of a simple ring having circumferentially spaced-apart threaded bosses on one of its radially outer or inner surface.

The above described arrangement provides for a simple and efficient way of adjustably attaching the spoke 26 to the inner ring 22 supporting the bearing casing 23. No additional fasteners or attachment parts are required. It provides for a compact design allowing for improved aerodynamic gaspath (additional radial space available to modify the inner and outer gaspath walls 28a, 28b). The threaded connection between the spoke inner end and the inner ring 22 reduces the accumulation of misalignment and simplify the bearing casing centralization procedure as compared to conventional spoke mounting arrangement with pads, bolts and shim spacers.

Figure 7:
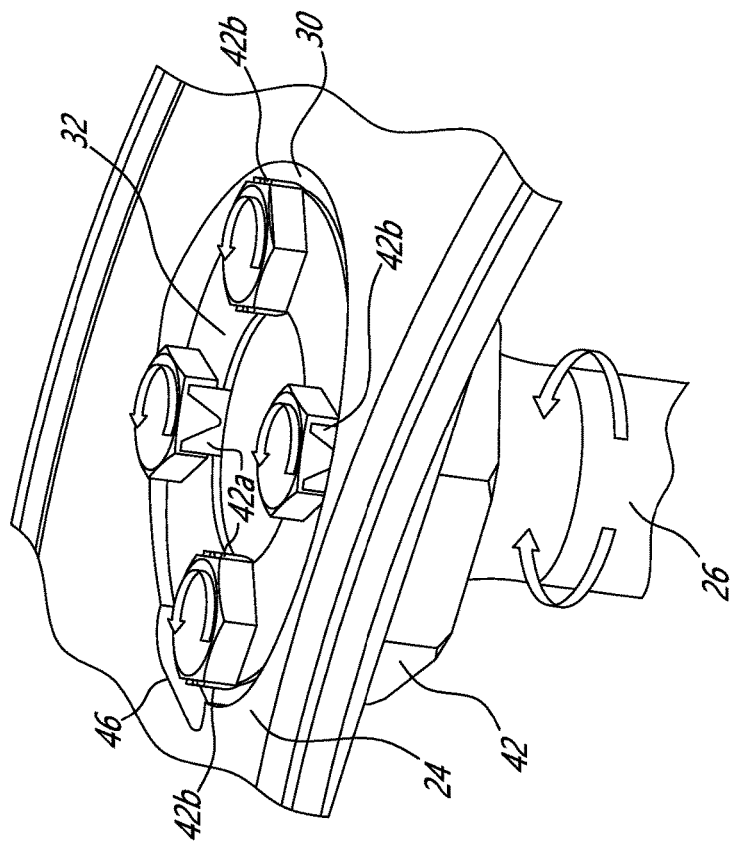
FIG. 7 is an isometric view illustrating the anti-rotation features of the bolted connection shown in FIG. 6.
Figure 6:
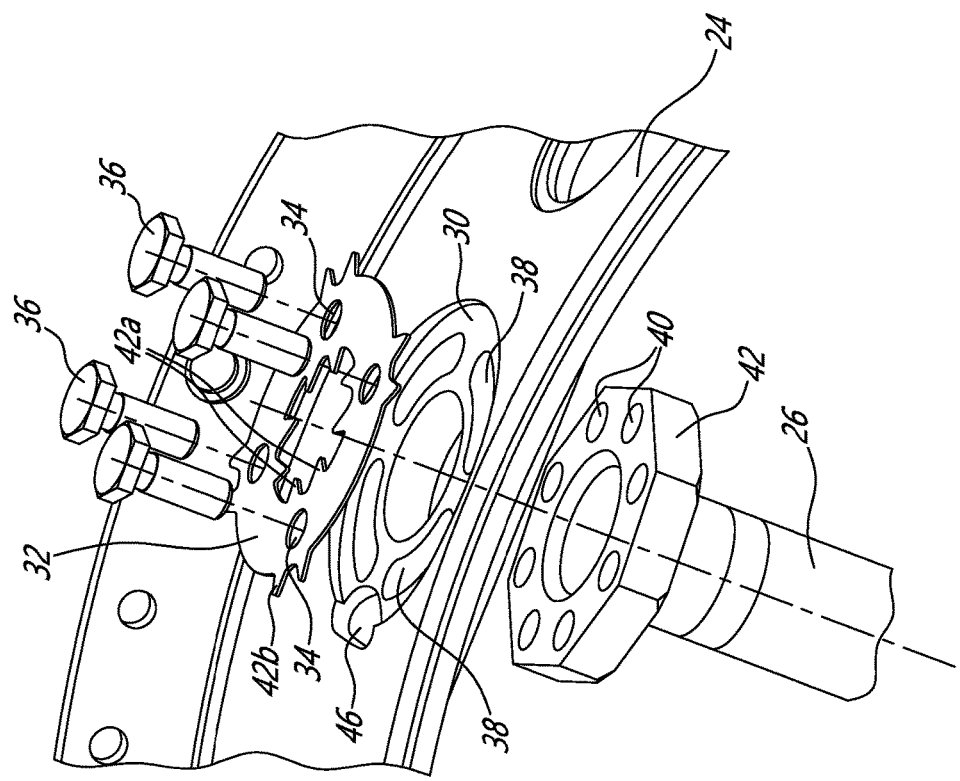
FIG. 6 is an exploded isometric view illustrating the bolted connection between one of the spokes and the outer structural ring.

As best shown in FIGS. 6 and 7, each spoke 26 may be bolted at its radially outer end to the outer structural ring 24. At each point of assembly, a seat 31 is defined in the radially outer surface of the outer ring 24 for receiving a washer 32. The washer 32 may have a flat body with circumferentially spaced-apart holes 34 define therein for individually receiving respective bolts 36 or equivalent threaded fasteners (4 in the illustrated example). Corresponding elongated mounting slots 38 are defined in the bottom of the seat 31 for receiving the bolts 36. Each slot 38 permits alignment with at least one corresponding threaded hole 40 of an annular array of holes defined in a mounting flange or head 42 at the radially outer end of the spoke 26. Accordingly, the washer 32 is positioned in its associated seat 31 so that the holes 34 defined therein are in alignment or registry with the corresponding holes 40 of the mounting flange of the spoke 26. After the holes 34 in the washer 32 have been appropriately angularly aligned with the corresponding holes 40 in the mounting flange of the spoke 26, the bolts 36 are tighten to firmly join the spoke 26 to the radially inner circumferential surface of the outer structural ring 24.

As shown in FIGS. 6 and 7, the washer 32 may be provided at each hole 34 with a pair of anti-rotation tabs 42. According to the illustrated embodiment, each pair of anti-rotation tab 42 comprises a first tab 42a on the inner diameter of the washer 32 and an opposed facing second tab 42b on the outer diameter of the washer 32. As shown in FIG. 7, each pair of first and second tabs 42a, 42b may be bent out of the plane of the washer 32 into engagement with the head of the associated bolt 36 to positively lock the same against rotation. In the illustrated embodiment, each pair of anti-rotation tabs 42 is engageable with opposed sides of a hexagonal head of the associated bolt 36. This effectively prevents loosening of the bolts 36. While deformable or bendable tabs have been shown, it is understood that any suitable types of locking tabs could be used as well.

Referring to FIG. 6, it can be seen that a peripheral portion of the washer may be deformed into an anti-rotation notch or catch 46 provided at one location around the perimeter of the washer seat 30. According to one embodiment, the peripheral portion of the washer 32 could be punched into the anti-rotation catch 46 after all the bolts 36 have been tighten and locked in position with the tabs 42. This prevents rotational movement of the washer 32 relative to the outer casing 24, thereby locking the spoke 26 against rotation about its longitudinal axis.

During the assembly of the mid-turbine frame, the threaded engagement of the spokes 26 in the threaded bosses 30 is adjusted by rotating the spokes 26 about their respective axes in the clockwise or counter-clockwise direction depending on the thread direction so that the radially outer end of the spoke 26 firmly abuts the radially inner circumferential surface of the outer ring 24. Each spoke is so rotated in order to adjust the length of the portion of the spoke projecting radially outwardly from the inner ring 22. The spokes are unthreaded until the radially outer end of all spokes uniformly abuts the inner surface of the outer ring. The length of the spokes is adjusted so that each spoke exerts a radially outwardly directed force against the inner surface of the outer ring. The forces shall be uniform all around the ring. Once all the spokes have been appropriately adjusted to collectively center the inner ring with respect to the outer ring, then, the bolts 36 are threadably engaged from outside of the outer ring with corresponding threaded holes defined in the head of the spoke at the radially outer end thereof.

The skilled reader will appreciate that the spokes 26 are mounted in compression between the radially inner and outer rings 22, 24. That is the load carrying spokes 36 are pre-stressed in compression during engine assembly as described hereinabove. Accordingly, a compression action is always maintained on the threads at the radially inner and outer ends of the spokes 26. This helps preventing loosening of the threaded connections at both ends of the spokes. During engine operation, when the spokes 26 are exposed to heat, the spokes tend to expand, thereby further increasing the pressure on the threads and, thus, preventing loosening. The advantage to building the spokes pre-stressed in compression is 2 fold: 1) the amount of assembly pre-stress is minimized, thereby facilitating assembly and, as the spokes thermally expand during engine operation, they will react against the inner and outer rings, thereby increasing the compressive loads in the spokes. If the spoke were to be assembled in tension, the level of pre-stress tension would be thermally reduced during engine operation, and, thus, the threaded connection subject to loosening. This could give rise to bearing de-centralization issues. As can be appreciated from the foregoing, these problems may be overcome by assembling the spokes in compression. Engine operation will only add to the amount of compression, thereby further preventing loosening of the threaded connections.

The above description is meant to be exemplary only, and one skilled in the art will recognize that changes may be made to the embodiments described without departing from the scope of the invention disclosed. Any modifications which fall within the scope of the present invention will be apparent to those skilled in the art, in light of a review of this disclosure, and such modifications are intended to fall within the appended claims.

The invention claimed is:

1. A mid-turbine frame of a gas turbine engine, comprising: an outer ring, an inner ring, and a plurality of circumferentially spaced-apart spokes structurally interconnecting the inner ring to the outer ring, the spokes having a radially inner threaded end threadably engaged to the inner ring and a radially outer end positioned to exert a force in a radially outward direction against a radially inner surface of the outer ring, the spokes being thereby held in compression between the inner and outer rings, wherein the spokes have at their radially outer end a flange in bearing contact with the radially inner surface of the outer ring.

2. The mid-turbine frame defined in claim 1, wherein threaded fasteners extend through the outer ring in threaded engagement with the radially outer ends of the spokes.

3. The mid-turbine frame defined in claim 2, wherein the threaded fasteners include bolts threadably engaged with threaded holes defined in the radially outer ends of the spokes.

4. The mid-turbine frame defined in claim 1, wherein at least two holes are defined in said flange, the holes being in registry with slots defined through the outer ring for receiving fasteners.

5. The mid-turbine frame defined in claim 1, wherein circumferentially spaced-apart bosses are integrally formed on the inner ring, and wherein threads are formed in said bosses for engagement with said spokes.

6. The mid-turbine frame defined in claim 5, wherein the bosses extends radially outwardly from a radially outer surface of the inner ring.

7. The mid-turbine frame defined in claim 1, wherein the spokes are threadably engaged with threads integrally formed on the inner ring.

8. A gas turbine engine comprising a first turbine section, a second turbine section, a mid-turbine frame located axially between the first and second turbine sections, the mid-turbine frame comprising: an outer structural ring, an inner structural ring configured to support a bearing, a plurality of load carrying spokes structurally interconnecting the outer structural ring to the inner structural ring, each load carrying spoke having a radially inner threaded end threadably engaged with mating threads integrally formed in the inner structural ring and a radially outer end mounted in bearing contact against a radially inner surface of the outer structural ring, the load carrying spokes being thereby held in compression between the inner and outer structural rings, wherein each of the load carrying spokes has at its radially outer end a flange in bearing contact with the radially inner surface of the outer structural ring.

9. The gas turbine engine defined in claim 8, wherein each of the load carrying spokes exert a force in a radially outward direction against the radially inner surface of the outer structural ring.

10. The gas turbine engine defined in claim 8, wherein threaded fasteners extend through the outer structural ring in threaded engagement with the radially outer ends of the load carrying spokes.

11. The gas turbine engine defined in claim 10, wherein the threaded fasteners include bolts threadably engaged in threaded holes defined in the radially outer ends of the load carrying spokes.

12. The gas turbine engine defined in claim 8, wherein at least two holes are defined in said flange, the holes being in registry with corresponding slots defined through the outer structural ring for receiving fasteners.

13. The gas turbine engine defined in claim 8, wherein circumferentially spaced-apart bosses are integrally formed on the inner structural ring, and wherein the mating threads are formed in said bosses.

14. The gas turbine engine defined in claim 13, wherein the bosses extends radially outwardly from a radially outer surface of the inner structural ring.

15. The gas turbine engine defined in claim 8, wherein the mating threads are integral to the inner structural ring.

16. A method of assembling a mid-turbine frame for use in a gas turbine engine axially between first and second turbine sections, the method comprising: threadably engaging respective radially inner threaded ends of individual spokes with corresponding threaded sites provided at circumferentially spaced-apart locations around a circumference of an inner structural ring, centralizing the inner structural ring relative to an outer structural ring, wherein centralizing comprises adjusting the length by which the spokes project radially outwardly from the inner structural ring by rotating the spoke about their respective longitudinal axes until respective radially outer ends of the spokes abut a radially inner surface of the outer structural ring and exert a radially outward force thereon, and then fastening the radially outer ends of the spokes to the outer structural ring to secure the spokes in compression between the inner and outer structural rings.

17. The method defined in claim 16, wherein fastening comprises bolting each spoke to the outer structural ring.

18. The method defined in claim 16, wherein adjusting the length comprises partially unthreading the spokes from the inner structural ring.

19. The method defined in claim 16, wherein threadably engaging comprises threadably engaging the spokes with threaded bosses integrally formed on the inner structural ring at each of the threaded sites.

* * * * *